United States Patent [19]

Jackson

[11] Patent Number: 4,904,546
[45] Date of Patent: Feb. 27, 1990

[54] MATERIAL SYSTEM FOR HIGH TEMPERATURE JET ENGINE OPERATION

[75] Inventor: Melvin R. Jackson, Schenectady, N.Y.

[73] Assignee: General Electric Company, Schenectady, N.Y.

[21] Appl. No.: 331,762

[22] Filed: Apr. 3, 1989

[51] Int. Cl.⁴ .............................................. B32B 15/00
[52] U.S. Cl. .................................... 428/661; 428/662; 428/666
[58] Field of Search ................ 428/661, 662, 667, 670; 416/241 R

[56] References Cited

U.S. PATENT DOCUMENTS

| | | | |
|---|---|---|---|
| 3,055,088 | 9/1962 | Cox .................................... | 428/662 |
| 3,219,477 | 11/1965 | Grubessich ......................... | 428/662 |
| 3,540,863 | 11/1970 | Priceman et al. .................... | 428/662 |
| 3,578,743 | 5/1971 | Bradley et al. ...................... | 428/662 |
| 3,595,633 | 7/1971 | Friedrich et al. .................... | 428/661 |
| 3,918,139 | 11/1975 | Felton ................................. | 428/670 |
| 4,117,179 | 9/1978 | Jackson .............................. | 428/662 |
| 4,123,594 | 10/1978 | Chang ................................ | 428/670 |

FOREIGN PATENT DOCUMENTS

| 639665 | 4/1962 | Canada ............................... | 428/662 |
|---|---|---|---|
| 1089057 | 11/1967 | United Kingdom ................ | 428/661 |

*Primary Examiner*—John J. Zimmerman
*Attorney, Agent, or Firm*—Paul E. Rochford; James C. Davis, Jr.; James Magee, Jr.

[57] ABSTRACT

A materials system is provided which is adapted for use in jet engines operable at high temperature and at lower density than possible with nickel base superalloys. A range of niobium base alloys is combined with a range of protective metallic coatings to provide a material system which permits a wide variety of alloy properties and performance characteristics to be combined in structural components of jet engines.

5 Claims, 3 Drawing Sheets

MATERIAL SYSTEM FOR HIGH TEMPERATURE JET ENGINE OPERATION

CROSS REFERENCE TO RELATED APPLICATIONS

The subject application relates to applications Ser. Nos. 202,357, filed June 6, 1988; 208,905, filed June 20, 1988; 214,078, filed July 1, 1988; 279,639, 279,640, and 280,085, filed Dec. 5, 1988; 290,399, filed Dec. 29, 1988; 288,394, filed Dec. 22, 1988; and 288,667, filed Dec. 22, 1988. The compositions of these applications are among those which can be employed in the material systems of the present invention. The texts of the copending applications are incorporated herein by reference.

BACKGROUND OF THE INVENTION

Historically, since the development of jet engines immediately following World War II, the operating temperature of the engines has been increased by different technical developments by about 15° F. per year. The present invention relates to an improvement in the temperature capabilities of materials used in the jet engines of about 450° F. This represents about a 30-year improvement in the operating temperature of jet engines. The gains these materials offer are about equivalent to the gains achieved from 1959 to 1989.

This scale of improvement in jet engine performance makes the subject invention, and the applications cross-referenced above, candidate inventions for use in the U.S. Air Force, Integrated High Performance Turbine Engine (IHPTE), propulsion initiative under which the Air Force seeks to double the thrust to weight ratio of a newly designed generation of jet engines over the most advanced production engines which are available today.

The most efficient production engine flying today has a thrust to weight ratio of about 10 to 1. The propulsion initiative of the Air Force is a proposed objective to bring that ratio to about 20 to 1.

The maximum metal temperatures of presently employed jet engines are about 2200° F. Materials which are presently used in jet engines which operate in the neighborhood of 2200° F. are molten at the temperatures above ~2450° F. The maximum metal temperature of jet engines employing the materials of the present invention can approach 2700°.

Another factor which suggests the utility of the materials system of the present invention in the Air Force propulsion initiative is that some of the materials have a density reduction of more than 20% when compared to the materials used in production engines today. Presently used nickel base superalloys have densities ranging from about 0.295 to 0.320 pounds per cubic inch and average over 0.300. Several materials of the materials systems of the present invention have densities less than 0.235.

In other words, there are materials in the materials systems of the present invention which have lower density than the nickel-base superalloy material presently employed in the formation of jet engines and there are materials of these systems which may operate at significantly higher temperature and, in fact, well above the temperature at which nickel base alloys are molten.

The lower density of the materials of fabrication of the engine is a very desirable property of these materials inasmuch as the use of lower density materials results in the engine operating with the desirable higher thrust to weight ratio as compared to the present generation of engines. The use of lower density materials is particularly important in the rotating parts of engines. Such rotating parts rotate at about 12,000 revolutions per minute and, accordingly, very high centrifugal forces are generated in the rotating parts. By reducing the density of the materials in the rotating parts of the engine without reducing their strength and toughness, the actual mass of material which must be built into such a rotating part can be greatly reduced. The increase in the thrust to weight ratio can accordingly be larger than a simple proportional reduction in density where the density of the material of which the engine is formed is decreased from the density of presently employed materials.

In present production engines rotating parts normally do not operate at temperatures above about 1900° F. An object of the present invention is to provide materials which can be incorporated into rotating parts for operation at significantly higher temperatures of the order of 2300° F. and/or which can operate at lower densities and provide a significant mass savings.

The higher operating temperature of a jet engine employing the materials system of the present invention has a number of advantages and benefits.

One advantage is that the burning of fuel in the engine is more complete and, therefore, more efficient. The burning is more complete because it is at a higher temperature. A complete or stoichiometric burning of fuel can produce a flame temperature of over 4000° F. Stoichiometric burning is avoided because such a temperature produced in an engine would require too much cooling to avoid material temperatures so great that essentially all materials in present production engines would melt. While the potential flame temperature of a future jet engine may reach 4000° F., the actual operating temperature of the hotter metal parts of a present production jet engine is about 2000° F. to 2200° F. This lower metal temperature is maintained, although the actual flame temperature is higher, through a complex set of cooling air flow schemes within the engine to protect the metal parts from the higher temperatures. This air flow for cooling engine parts requires a lot of special plumbing and reduces engine efficiency both because of the lower operating temperatures and because of the need for extensive cooling air flow and its attendant weighty plumbing. An engine which can operate with hotter metal parts gains in efficiency both from increased operating temperature and from reductions in cooling air flow and associated plumbing.

The materials employed in the present invention are components of a materials system. The projected gain in operating temperature of a jet engine according to the present invention is the result of use of a different material system than has been used heretofore. The system involves two or more distinct elements, each of which has a different composition and each of which performs a different function in the operation of the system within the materials structures of the jet engine. The two basic elements of the system are, first, a lighter weight metallic substrate which provides structural capability for the system, and, second, a metallic coating material which protects the substrate from environmental attack. Other elements may be included. One such element of the system may be an overcoating of a non-metallic character.

Different parts of an engine operate at different temperatures. The combination of substrate and coating are selected pursuant to the present invention to suit the material needs of specific engine parts.

Not all materials of an engine need be at the highest temperature. The coating materials of copending application Ser. No. 214,078, filed July 7, 1988, and particularly the RuFeCrAlY material can operate in air without substantial loss of coating material for extended periods at temperatures of 2750° F. and higher. In other words, the metallic coating material of copending application Ser. No. 214,078 is capable of protecting metallic substrates from oxidative attack to temperatures of 2750° F. and higher. This is a reference temperature for use of the materials of the materials systems of the present invention.

A wide variety of substrate materials are disclosed in the copending applications cross-referenced above and these substrate materials may be coated with the coating materials of Ser. No. 214,078.

Individual substrate materials and their individual distinctive properties are disclosed in the copending applications referenced above and they can be used in conjunction with protective coating materials such as the RuCrAlY and RuFeCrAlY materials of copending application Ser. No. 214,078 referred to above. These substrate materials are all ductile alloy materials and are not brittle intermetallic compounds as many high temperature materials are.

There are several substrate materials of different compositions which are suitable for use with coatings such as the RuCrAlY and RuFeCrAlY coatings of Ser. No. 214,078. Not all of the substrates have the same compositions or the same density or the same melting point or the same tensile properties at high use temperatures. In treating these combinations of materials as a system, advantage can be taken of the variety of high temperature alloy materials disclosed in the referenced copending applications to provide a combination of substrate and coating materials which best suit a specific use application as for example a specific part such as a vane, within a jet engine. For example, the variety of materials disclosed in the several copending applications referenced above makes it possible to provide materials and material combinations to satisfy a number of different temperature, density, strength and related materials criteria. The materials criteria of materials for use in rotating parts is not the same as the criteria for use in stationary parts. Similarly, the temperature at which a material is to be used is influential both in selection of the substrate as well as in selection of a coating for the substrate if one is to be used. Moreover, it is realized that the materials of the systems of the present invention are particularly suitable for the higher temperature portions of a jet engine. Other materials such as titanium base alloys will be preferred for use in lower temperature portions of the engine such as in the early stage compressor blades of the engine.

BRIEF STATEMENT OF THE INVENTION

It is, accordingly, one object of the present invention to provide a materials system useful in the formation of gas turbine engines.

Another object is to provide a materials system particularly suited to the formation of jet engines for operation at higher temperatures.

Another object is to combine components of different materials systems to permit a high temperature coating to be used in connection with a high temperature substrate.

Other objects will be in part apparent and in part pointed out in the description which follows.

In one of its broader aspects, the objects of the present invention are achieved by providing a composite structure including a structural metal substrate and a protective metal coating. The structure substrate is a substrate of a metal having good ductility and having high strength at high temperature. Such a substrate metal may be selected from a group consisting of the following niobium base alloys:

A Niobium; 31–48 a/o titanium; 8–21 a/o aluminum
B Niobium; 32–48 a/o titanium; 8–16 a/o aluminum; 2–12 chromium; provided that the sum (Al+Cr)≦22 a/o, and where Ti is less than 37 a/o the sum (Al+Cr)≦16 a/o
C Niobium; 40–48 a/o titanium; 12–22 a/o aluminum; 0.5–6 a/o hafnium
D Niobium; 32–45 a/o titanium; 8–15 a/o hafnium; 3–18 a/o aluminum
E Niobium; 35–45 a/o titanium; 8–15 a/o hafnium
F Niobium; 4–10 a/o hafnium; 4–10 a/o aluminum; 5–18 a/o titanium; 3–8 a/o chromium
G Niobium; 5–18 a/o hafnium; 5–22 a/o aluminum The substrate metal is formed into a configured structure, such as a disk or a vane, suitable for use in a jet engine. At least a portion of the structure is coated with a high temperature metallic surface layer which is metallurgically bonded to the surface of the substrate.

The composition of the surface layer may be essentially chromium, ruthenium and aluminum in the proportion essentially as set forth within the bounds of curve A of FIG. 3.

A preferred composition of a surface layer is a composition in the proportions essentially as set forth within the bounds of curve B if FIG. 3.

Further, regarding the composition of the surface layer, certain modifications may be made to the above composition by substituting other metals for at least part of the ruthenium and/or chromium. Metals which can be substituted for ruthenium in the above composition include iron, nickel and cobalt. The elements iron, nickel and cobalt all have very large solubilities in the hexagonal close packed ruthenium crystal structure, especially at high temperatures. The three elements iron, nickel and cobalt form aluminides of the B2 ordered body centered cubic structure. This is the same structure as the RuAl of the above composition and the solubility of these three substituent metals, iron, nickel and cobalt, in the RuAl aluminide is deemed to be substantial.

The substituent metals iron, nickel and cobalt are substituted in the above compositions in the place of ruthenium. Also, the iron can be substituted to a limited degree for chromium.

Iron, nickel and cobalt, either individually or in any combination, can be substituted into the CrRuAl up to about 15 atomic percent for nickel and cobalt and up to 20% for iron.

This composition is written as follows:

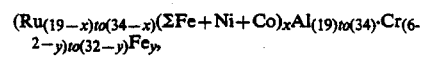

wherein Σ is a symbol indicating that the sum of the concentrations of the iron, nickel and cobalt present add up to the concentration x in atom percent, and
wherein the value of x is between 0 and 15, and wherein the value of y is between 0 and 5 atom percent, and wherein the total value of the expression in atom percent is 100.

Another alternative composition may be expressed as follows:

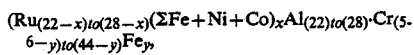

wherein Σ has the meaning stated above, and wherein x has a value between 0 and 10, and wherein y has a value between 0 and 5, and wherein the total value of the expression in atom percent is 100.

For each of these compositions it is contemplated that minor inclusions of other elements as an impurity will and do occur in the conventional processing of the compositions.

As used herein the expression "consisting essentially of" includes such minor inclusion of other elements which do not detract from the disclosed ability of the composition to perform its intended function. In this case, the coating of chromium, ruthenium and aluminum with or without the indicated substituents for ruthenium and chromium, provides the function of protecting a substrate from oxidation or other atmospheric degradation. It is also contemplated that other elements which do not detract from the properties of the compositions may be included as well.

BRIEF DESCRIPTION OF THE DRAWINGS

A description of the invention which follows will be understood with greater clarity if reference is made to the accompanying drawing in which.

DETAILED DESCRIPTION OF THE INVENTION

Figure 2:
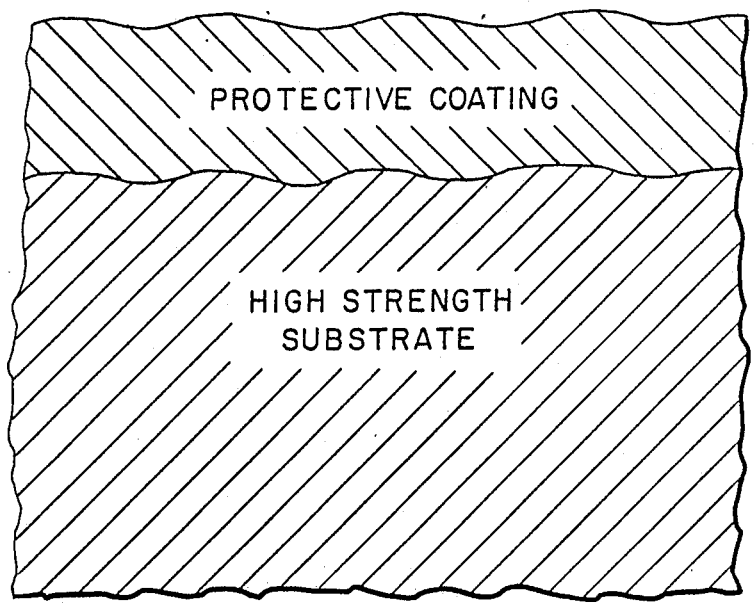
FIG. 2 is a semischematic illustration of a structure as provided pursuant to the present invention illustrating a substrate structure and protective surface layer.

The practice of the present invention involves combining a configured metal substrate with a protective metal coating to form an article having a high operating temperature. It is the substrate and coating combination such as is illustrated in FIG. 2 which is the essence of the subject invention.

In a jet engine, there are needs for engine parts which have different performance criteria. As indicated above, some parts are stationary and others are rotating. Other parts see high temperature gases and others see lower temperature gases. Some engine parts are load bearing and exposed to operating pressure while others do not encounter significant pressure. In addition, some parts rotate at very high speeds and others do not.

Because of these different operating criteria, different alloy characteristics are needed for the variety of parts which are included within an engine. Many of the niobium based alloys of the copending applications need some protection from oxidation and other atmospheric attack and this protection may be provided by metallurgically bonding to the surface of the formed part a coating of a metal such as one of those described in copending application Serial No. 214,078 to provide the needed protection of the substrate material.

There are a number of ways in which the surface coating can be applied to a substrate to provide a material system suitable for use in designated parts of a jet engine. One such method of application is through a plasma spray technique. Pursuant to this technique, finely divided particles of the coating material to be applied to the substrate engine part are introduced into a plasma gun on a continuous basis and the molten metal droplets formed as the material passes through the flame of the gun are deposited on the exposed surfaces of the engine part substrate. A metallurgical bond between the coating and the substrate may be formed in this way or through a separate diffusion bond heating operation. Alternatively, the substrate may be preheated as, for example, in a low pressure plasma deposition apparatus so that when the droplets of coating material impact on the surface of the substrate part, a bonding occurs between the substrate and the coating to link the coating intimately with the surface of the part and to preclude the access of the atmosphere to the protected substrate.

In addition, after the deposit of protective coating metal has been made on a part, the part and its coating may be subjected to a HIPing operation to densify the coating in part and to increase the metallurgical bond which is formed therebetween.

As is explained in the copending application, Ser. No. 214,078, there are a variety of materials suitable for formation of a coating. One such material is an alloy of ruthenium, chromium and aluminum and specifically a coating having a composition corresponding to one of those enclosed within the envelope A of the accompanying FIG. 3. Another such material, and a preferred material, is a coating having a composition corresponding to one of those enclosed within the smaller envelope B of the accompanying FIG. 3.

Certain modifications may be made to the above composition by substituting other metals for at least part of the ruthenium and/or chromium. Metals which can be substituted for ruthenium in the above composition include iron, nickel and cobalt. The elements iron, nickel and cobalt all have very large solubilities in the hexagonal close packed ruthenium crystal structure, especially at high temperatures. The three elements iron, nickel and cobalt form aluminides of the B2 ordered body centered cubic structure. This is the same structure as the RuAl of the above composition and the solubility of these three substituent metals, iron, nickel and cobalt, in the RuAl aluminide is deemed to be substantial.

The substituent metals iron, nickel and cobalt are substituted in the above compositions in the place of ruthenium. Also, the iron can be substituted to a limited degree for chromium.

Pursuant to this modification, iron, nickel and cobalt, either individually or in any combination, can be substituted into the CrRuAl up to about 15 atomic percent for nickel and cobalt and up to 20% for iron.

This composition is written as follows:

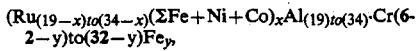

wherein Σ is a symbol indicating that the sum of the concentrations of the iron, nickel and cobalt present add up to the concentration x in atom percent, and wherein the value of x is between 0 and 15, and wherein the value of y is between 0 and 5 atom percent, and wherein the total value of the expression in atom percent is 100.

In another modification, the compositions of the protection coating may be expressed as follows:

$$(Ru_{(22-x) to (28-x)}(\Sigma Fe+Ni+Co)_x Al_{(22) to (28)} \cdot Cr_{(5.6-y) to (44-y)} Fe_y,$$

wherein Σ has the meaning stated above, and wherein x has a value between 0 ad 10, and wherein y has a value between 0 and 5, and wherein the total value of the expression in atom percent is 100.

One preferred composition of such a layer is an alloy as follows: 55 a/o Cr; 20 a/o Al; 14 a/o Ru; 11 a/o Fe. This alloy displayed no weight loss after over 100 hours of heating at a temperature of 2730° F.

For each of these compositions it is contemplated that minor inclusions of other elements as an impurity will and do occur in the conventional processing of the compositions. It is also contemplated that other elements which do not detract from the properties of the compositions may be included as well.

The coatings of the structure of this invention are formed on a shaped and configured substrate. The substrate must be capable of providing the physical properties such as tensile strength, ductility, toughness and the like.

Figure 1:
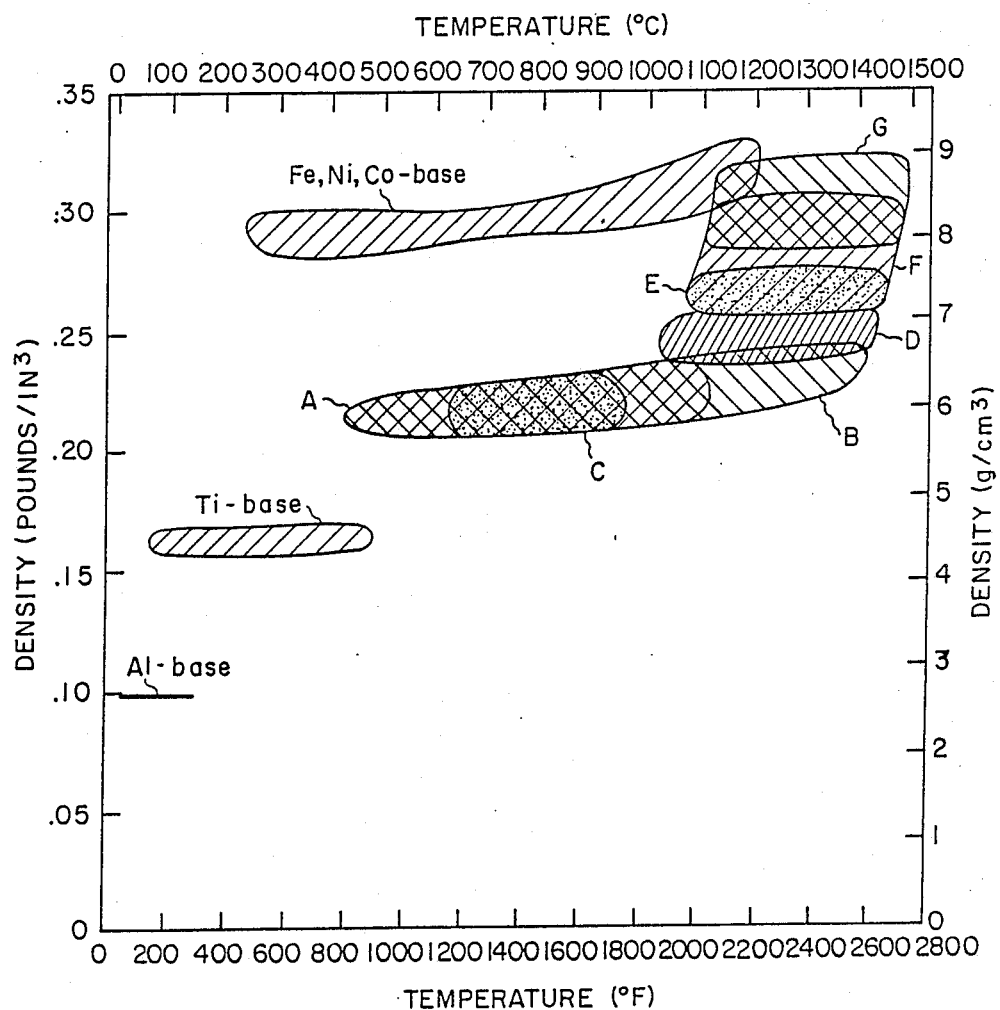
FIG. 1 is a graphical illustration of the approximate relationship between density and use temperature for a number of alloys which may serve as substrates in structures of the present invention.

Regarding the substrate alloys which may be employed, there is a family of niobium-based alloys which have a spectrum of density and temperature properties as illustrated in FIG. 1. Seven specific alloys having distinct alloy compositions are set forth in seven copending applications as listed in Table I, immediately below.

TABLE I

Family of Ductile High Temperature Niobium Base Alloys

| Alloy | Serial No. | Composition in Atomic Percent |
|---|---|---|
| A | 202,357 | Nb, 31–48 Ti, 8–21 Al |
| B | 280,085 | Nb, 32–48 Ti, 8–16 Al, 2–12 Cr, where (Al + Cr) ≦ 22 a/o where Ti is more than 37 a/o and where (Al + Cr) ≦ 16 a/o where Ti is less than 37 a/o |
| C | 279,639 | Nb, 40–48 Ti, 12–22 Al, 0.5–6 Hf |
| D | 288,394 | Nb, 32–45 Ti, 8–15 Hf, 3–18 Al |
| E | 288,667 | Nb, 35–45 Ti, 8–15 Hf |
| F | 290,399 | Nb 54–84, Hf 4–10, Al 4–10, Ti 5–18, Cr 3–8 |
| G | 279,640 | Nb, 5–18 Hf, 5–22 Al |

As is evident from the Table, the Ser. Nos. of the different alloys are set forth in the Table and the corresponding compositions of the alloys are also given on the same line as the Serial No. For convenience of reference, the letters A through G are assigned to the seven alloys of Table I. These letters are also assigned to the designated areas of a shoe shaped envelope in FIG. 1 enclosing a combination of temperature and density properties corresponding approximately to those in which the family of niobium based alloys has useful structural properties. The letters are assigned to different zones of the shoe shaped envelope and indicate approximately the smaller envelope of temperature and density properties for the corresponding designated alloy.

Considering each alloy in turn, alloy "A" has an envelope extending over a broad temperature range from about 800° F. to about 1900° F. in which the alloy has useful structural properties. The structural substrate alloys "A" through "G" have good ductility over their entire temperature range from room temperature to the highest indicated use temperature of FIG. 1. However, FIG. 1 emphasizes the temperature and density range most advantageous for fabrication of jet engine parts. The density range of the alloys in this envelope A extend from density of less than 6 to a density of about 6.6 g/cm$^3$. However, the envelope of temperature and density properties is not a rectangle enclosed within these numerical limits, 800°–1900° F. and 6–6.6, but rather is a envelope having the shape indicated in FIG. 1 at the lower portion of the larger shoe-shaped envelope.

In this connection, it should be pointed out that alloy "A" has substantially improved yield strength through the addition of aluminum to a titanium niobium base and this addition, of course, also reduces the density of the alloy.

The further addition of chromium to the alloy "A", to form alloy "B" according to the recipe set forth in Table I for alloy "B", yields a further increase of tensile strength in a lower temperature range in the neighborhood of 800° F.; a decrease in the tensile strength at about 1600° F.; and an increase in tensile strength above 2200° F. Where the ratio of titanium to niobium is lower, the lower temperature strength, below about 1400° F., is lower, but the higher temperature strength, up to 2200° F. and above, is higher than alloys in which there is a higher ratio of titanium to niobium.

Accordingly, it will be readily evident that criteria for use of a particular alloy must depend on the projected use temperature and the properties which are needed in the alloy at that use temperature. The alloys as set forth in Table I which are used as substrate materials in the materials system of this invention do not have simple properties which are linear functions of the addition of one alloying ingredient or another. The properties of particular alloys under particular operating conditions may be determined readily by experiment since the alloy compositions themselves are expressly set forth in Table I and in the claims of the subject application.

The alloy "B" is distinct from alloy "A" in that it contains chromium additive and has certain limits with respect to the concentration of the combined aluminum and chromium additives. The envelope for alloy B occupies almost the same portion of the shoe-shaped graph of FIG. 1 as the Alloy A but extends for the full length of the envelope forming the bottom of the shoe. For this reason the "toe" position of the lower portion of the envelope is marked alloys "A" and "B". Alloy "B" has greater strength than alloy "A" at temperatures below about 400° F.

An alloy designed "C" contains niobium, titanium aluminum and hafnium as indicated in Table I and occupies a zone within the lower envelope of the shoe of FIG. 1. The hafnium containing alloy has been demonstrated to have higher yield strength than the alloy without the hafnium at a temperature of about 1300° F. and, in fact, the yield strength is about 50% higher than that of the hafnium free alloys "A" or "B" or the figure.

Alloy "D" of FIG. 1 is seen to be immediately above the right end portion of lower envelope representing the density vs. temperature values for alloy "B". Alloy "D", as is evident from Table I, is an alloy containing niobium, titanium, aluminum and hafnium within the specified ratios. The alloy is seen to have higher hafnium concentrations than alloy "C". It has been found that the use strength measurement values of alloy "D" increase with increasing aluminum concentration to about 760° C. but at higher temperatures there is a reversal in this trend so that at 980 and 1200° C. (2200° F.) the increasing aluminum content does not result in increasing tensile properties. This reversal of a property with a change in concentration of one of the additives is not unusual in the alloys of this family. For this reason it is important to use the information set out here in determining what alloy composition should be selected but it is also important to test the selected alloy for the particular property criteria which are sought in an alloy of this family in determining which alloy is most suitable for a particular jet engine part and use temperature.

For example, in this connection, it has been found that the ductility of the alloys are good at high temperatures. However, it has been found that at higher aluminum content the ductility decreases as the aluminum content increases. For this reason, tests should be conducted for room temperature ductility of a particular selected alloy of composition "D". Samples of alloy "D" having different concentrations of aluminum were subjected to oxidation testing at temperatures of 800° C. and 1200° C. These substrate alloys, have far better oxidative resistance than commercial alloys such as alloy CB752, which were tested simultaneously with the subject alloys. It was observed that the higher the level of aluminum in the substrate alloy "D", the lower the level of weight gain of an alloy sample due to oxidation of its unprotected surface.

The ability of substrate alloys to resist oxidative attack is a very useful property particularly at temperatures lower than 2200° F. However, the use of the coating as described above in connection with an alloy of the composition of the "D" samples, as listed in Table I, is necessary for higher temperature use. Here again, the relationship between the composition of an alloy and the operating criteria for use of the alloy in a jet engine indicates that it is highly desirable to select the right substrate and to combine it with a preferred coating in order to form an engine part which has optimum performance characteristics. For example, the alloys of composition "D" are deemed to have good combinations of properties for use in the form of sheets. Such sheets have outstanding properties, including strength at high temperature and sheets formed of alloy "D", and coated as described above, are suitable for use in engine structures requiring high strength in sheet form at high temperatures.

The composition of alloy "E" is set forth in Table I. The relationship of the temperature capabilities and density of alloy "E" are illustrated in FIG. 1 as being slightly higher in density and very slightly higher in temperature capability than the alloy of composition "D" in Table I.

The capabilities of alloy "E" have been compared with a commercial alloy which is commercially available under the designation HS-188. Alloy HS-188 is a wrought cobalt based alloy which is used for high temperature sheet metal applications. The alloy of the composition "E" was found to be superior in yield strength at all test temperatures from room temperature to 1200° F. to the commercial HS-188 alloy. In addition, alloy "E" is 20% lighter in weight than the commercial alloy HS-188. Comparative tests were also conducted between the alloy of composition "E" and the commercial alloy CB-752 with regard to resistance to oxidation. Clear superiority of alloy "E" was demonstrated from these tests, as is set forth in copending application, Ser. No. 288,667.

With reference again to FIG. 1, the alloy "F" is indicated from the figure to have a higher density and a slightly higher temperature capability than alloy "E". Some alloys of composition "F" may be found to have relatively lower ductility at room temperature. This may be attributed to the presence of relatively high concentrations of aluminum. There is a close relationship between the concentration of titanium in an alloy and the concentration of aluminum which can be present in the alloy without causing reduction or loss of ductility. Where ductility is low, titanium should be increased or aluminum should be decreased.

Alloys of composition "F" display high strength at high temperatures. A value of 17.8 was observed at 1200° F. for an alloy containing Nb; 5 a/o hafnium; 15 a/o aluminum; 15 a/o titanium; and 8 a/o chromium. This is a very significant strength at 1200° F. This alloy had an elongation of 26% at 1200° F. but had no measurable ductility at room temperature. Preferred alloys of composition "F" have higher titanium concentrations than aluminum concentrations as it is the titanium which solubilizes the aluminum and avoids the reduction or loss of alloy ductility.

Alloy "G" is the last of the family of novel niobium based alloys, the density and temperature capabilities of which are plotted in FIG. 1. Alloy "G" has the highest range of densities and the highest range of temperature capabilities of the family of alloys graphed in FIG. 1.

It is evident from FIG. 1 that the range of densities of alloy "G" closely approximates the range of density of the iron, nickel, and cobalt superalloys, the density and temperature ranges of which are also plotted in FIG. 1. The alloys of compositions "G" have good properties at the lower ranges of temperature within the envelope of the superalloys. However, unless the higher temperature capabilities of alloy "G" above about 2200° F. are to be used, or unless the coated alloys of the instant system have a desired set of properties not available from the superalloys, the use of the more conventional superalloys for applications at temperatures below about 2200° F. may be preferred.

Accordingly, the shaded envelope of FIG. 1 is meant to depict the density and temperature ranges at which the coated alloys of the present system are particularly advantageous, based on a combination of density and temperature properties.

The alloys of the "G" group contain 5 to 18 a/o hafnium, and 5 to 22 a/o aluminum, the balance being niobium. The density range extends from about 7.9 to about 8.8 grams/cm$^3$ An alloy having 15 a/o hafnium, 20 a/o aluminum, and about 65 a/o niobium has a density of about 7.9 and has a tensile strength at 1200° C. of about 45 ksi. Test apparatus for testing tensile strength was limited to testing at 1200° C. However, from the tensile value determined at 900° C. (61 ksi) it was estimated that the alloy will have useful strength at temperatures in excess of 2600° F. and as high as 2700° F. and possibly more.

Coated alloys of the materials system described herein may be employed in high temperature use applications in combination with uncoated alloys. One such uncoated alloy adapted for use at temperatures above 2300° F. is the alloy having a FeCrAlY base but having RuAl additive as described in copending application for patent Ser. No. 209,905, filed June 20, 1988. This alloy is essentially an iron base alloy having compositions within the following ranges:

| Ingredient | Range of Concentrations in Atomic % | |
| --- | --- | --- |
| | From about | To about |
| Iron | Balance | |
| Chromium | 15 | 20 |
| Ruthenium | 4 | 20 |
| Aluminum | 16 | 30 |
| Yttrium | 0 | 0.2 |

What is claimed and sought to be protected by Letters Patent of the United States is as follows:

1. A composite structure having high strength at high temperatures, said structure comprising a shaped structural metal substrate of at least one metal selected from the group consisting of the following niobium base alloys as follows:.

A Niobium; 31–48 a/o titanium; 8–21 a/o aluminum

Figure 3:
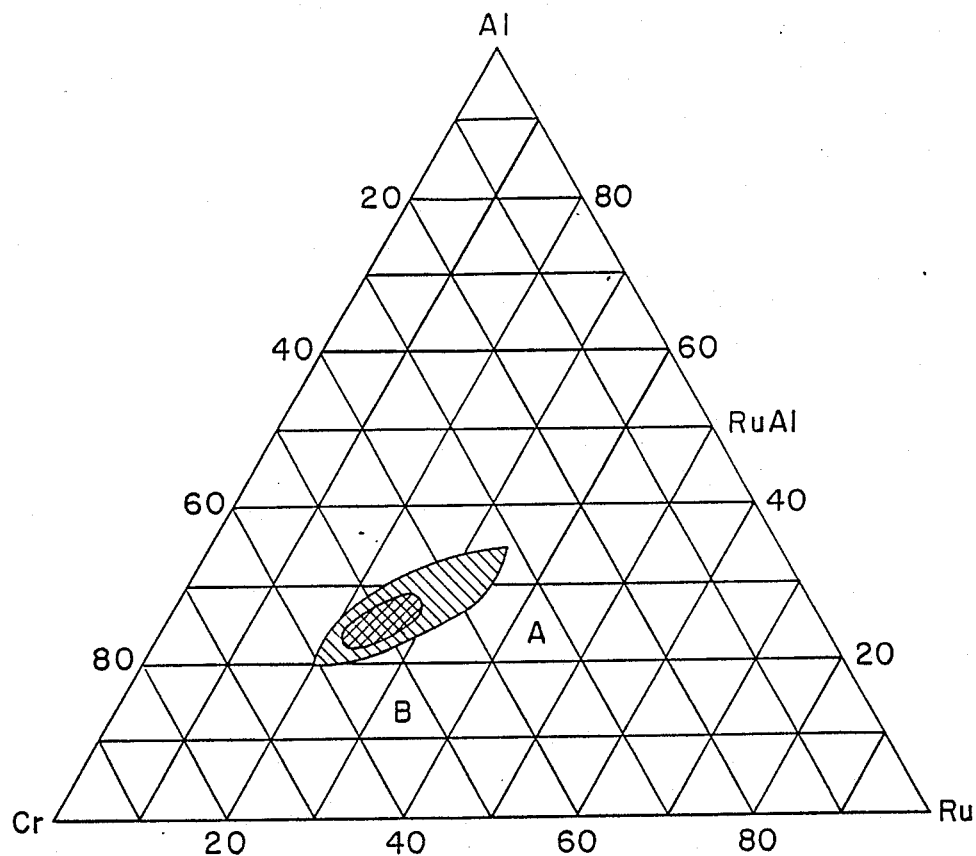
FIG. 3 is a triaxial plot of ruthenium, aluminum, and chromium compositions.

B Niobium; 32–48 a/o titanium; 8–16 a/o aluminum; 2–12 chromium provided that the sum (Al+Cr)≦22% a/o, and where Ti is less than 37 a/o the sum (Al+Cr)≦16 a/o C Niobium; 40–48 a/o titanium; 12–22 a/o aluminum; 0.5–6 a/o hafnium D Niobium; 32–45 a/o titanium; 8–15 a/o hafnium; 3–18 a/o aluminum E Niobium; 35–45 a/o titanium; 8–15 a/o hafnium F Niobium; 4–10 a/o hafnium; 4–10 a/o aluminum; 5–18 a/o titanium; 3–8 a/o chromium G Niobium; 5–18 a/o hafnium; 5–22 a/o aluminum and a protective metal coating on at least a portion of the substrate surface to protect the substrate from environmental attack, said coating having the composition as defined within the enclosure A of FIG. 3.

2. The structure of claim 1, in which the composition is defined within the enclosure B of FIG. 3.

3. The composite structure of claim 1, in which the composition of the coating is as follows:

$$(Ru_{(19-x)\,to\,(34-x)}(\Sigma Fe+Ni+Co)_x Al_{(19)\,to\,(34)} \cdot Cr_{(6-2-y)\,to\,(32-y)} Fe_y,$$

wherein Σ is a symbol indicating that the sum of the concentrations of the iron, nickel and cobalt present add up to the concentration x in atom percent, and wherein the value of x is between 0 and 15, and wherein the value of y is between 0 and 5 atom percent, and wherein the total value of the expression in atom percent is 100.

4. A composite structure of claim 1, in which the composition of the coating is as follows:

$$(Ru_{(22-x)\,to\,(28-x)}(\Sigma Fe+Ni+Co)_x Al_{(22)\,to\,(28)} \cdot Cr_{(5-6-y)\,to\,(44-y)} Fe_y,$$

wherein Σ has the meaning stated above, and wherein x has a value between 0 and 10, and wherein y has a value between 0 and 5, and wherein the total value of the expression in atom percent is 100.

5. The composite structure of claim 1, in which the coating has the following composition:

55 a/o Cr; 20 a/o Al; 14 a/o Ru; 11 a/o Fe.

* * * * *